United States Patent [19]
Swessel

[11] Patent Number: 6,065,172
[45] Date of Patent: May 23, 2000

[54] HYDRAULIC CONTROL CIRCUIT

[75] Inventor: Michael A. Swessel, East Troy, Wis.

[73] Assignee: Rite-Hite Holding Corporation, Milwaukee, Wis.

[21] Appl. No.: 09/094,296

[22] Filed: Jun. 9, 1998

[51] Int. Cl.[7] .................................................. E01D 1/00
[52] U.S. Cl. ....................................................... 14/71.7
[58] Field of Search ...................................... 14/71.7, 71.3

[56] References Cited

U.S. PATENT DOCUMENTS

| | | | |
|---|---|---|---|
| 2,881,457 | 4/1959 | Rodgers . | |
| 3,201,814 | 8/1965 | Le Clear | 14/71.7 |
| 3,235,895 | 2/1966 | Wallace et al. . | |
| 3,290,709 | 12/1966 | Whitenack, Jr. et al. . | |
| 3,290,710 | 12/1966 | Whitenack, Jr. . | |
| 3,388,413 | 6/1968 | Clarke | 14/71.7 |
| 4,110,860 | 9/1978 | Neff et al. | 14/71.7 |
| 4,365,374 | 12/1982 | Bennett | 14/71.7 |
| 4,744,121 | 5/1988 | Swessel et al. | 14/71.7 |
| 4,944,062 | 7/1990 | Walker | 14/71.3 |
| 4,955,923 | 9/1990 | Hagemen | 14/71.3 |
| 4,979,253 | 12/1990 | Alexander | 14/71.7 |
| 5,088,143 | 2/1992 | Alexander | 14/69.5 |
| 5,097,857 | 3/1992 | Mayhew | 137/1 |
| 5,475,888 | 12/1995 | Massey | 14/69.5 |
| 5,544,381 | 8/1996 | Alexander | 14/71.7 |

FOREIGN PATENT DOCUMENTS

| | | |
|---|---|---|
| 1 146 309 | 5/1983 | Canada . |
| 30 49 611 A1 | 7/1982 | Germany . |
| 34 12 564 A1 | 10/1985 | Germany . |
| 36 12 252 A1 | 10/1987 | Germany . |

OTHER PUBLICATIONS

*International Search Report* concerning International Application Ser. No. PCT/US99/13056, European Patent Office, dated Sep. 27, 1999, 7 pgs.

Declaration of Michael A. Swessel describing hydraulic control circuit installed in 1983.

*Primary Examiner*—James A. Lisehora
*Attorney, Agent, or Firm*—Marshall, O'Toole, Gerstein, Murray & Borun

[57] ABSTRACT

A hydraulic control circuit for a dock leveler which includes a deck pivotable between stored and raised positions and a lip pivoted to the deck for movement between pendant and extended positions is disclosed. The hydraulic control circuit, includes a deck cylinder couplable to the deck for controlling motion of the deck, a lip cylinder couplable to the lip for controlling motion of the lip, a pump for providing a source of pressurized fluid to the deck and lip cylinders, and an operator-actuated switch for selectively directing the pressurized hydraulic fluid to one of the deck cylinders and the lip cylinder.

9 Claims, 3 Drawing Sheets

HYDRAULIC CONTROL CIRCUIT

FIELD OF THE INVENTION

The invention is directed generally to dock levelers, and more particularly to a hydraulic control circuit for a dock leveler.

BACKGROUND OF THE INVENTION

A dock leveler is a device intended to bridge the gap between an adjacent parked vehicle at a loading dock and the loading dock itself, for the purpose of loading and unloading the vehicle. Typically, a dock leveler has a deck assembly which stores horizontally and level with the dock floor and which is pivotable about a rear hinge to allow for an angular raised position of the deck assembly. A pivoting lip is included which can extend outward from the raised deck assembly to rest on the adjacent parked vehicle which is being loaded or unloaded, thereby providing a bridge between the adjacent parked vehicle and the loading dock to allow material handling vehicles or personnel to pass between the loading dock and the adjacent parked vehicle. When not being used, the leveler is typically stored with the deck assembly in the horizontal position, and the pivoting lip hanging pendant (downwardly) and stored within lip keepers. The angular raising movement of the deck assembly away from this stored position allows clearance for the lip to pivot to its extended position. Hydraulics are typically used for the purpose of controlling the movement of both the deck and the lip, as is well-known in the art.

The present invention is directed to a hydraulic control system that uses separate hydraulic cylinders to control deck assembly motion, and the motion of the lip, as is typical. In most existing dock levelers, the operational sequence is initiated by powering a pump to supply pressurized hydraulic fluid to the deck cylinder. The deck assembly typically rises above its stored position to an upwardly inclined angle. It is typically necessary to raise the deck assembly to this inclined angle so that the lip can be pivoted from the pendant to an extended position without interference with the adjacent parked vehicle. Typically, once the deck assembly reaches a predetermined angle (i.e., the angle at which the deck cylinder is fully extended), the pressurized hydraulic fluid being provided by the pump is diverted to a second cylinder (the lip cylinder) which then pivots the lip from the pendant position to the extended position. To achieve this function, hydraulic control circuits for dock levelers usually include a sequencing valve between the main cylinder and the lip cylinder. Once the deck cylinder has extended to its full stroke, pressure in the hydraulic lines begins to rise, since the pump is still pumping and no further deck motion is possible. The sequencing valve senses this increase in hydraulic pressure and is moved from a position where it is blocking the flow of fluid to the lip cylinder to a position where it allows the flow of fluid to the lip cylinder, and extending of the lip subsequently occurs. Under this conventional operation, the lip thus automatically pivotally extends without operator intervention once the deck assembly reaches the top of its stroke.

Most existing levelers are also capable of so-called "short cycle" operation in which the lip may be extended even though the deck assembly is not raised to its full height. Such a feature gives an operator enhanced control. In a short cycle situation, the control box for the dock leveler will include a first button or other control that allows the deck assembly to be raised, and also a separate control for extending the lip (a "lipout" button). If the lip out button is pushed before the deck has risen to its full height, the lip will nonetheless extend. Typically, this is done by providing a normally open solenoid valve between the pump and the deck cylinder. Actuating the lip out control closes this normally open valve. The closing of this solenoid valve thus mimics the hydraulic pressurization that occurs when the deck cylinder is fully extended. As a result, an increase in hydraulic pressure occurs, the sequencing valve to the lip cylinder opens, and the pivoting lip can extend.

Thus, in conventional hydraulic dock leveler operation, the pivoting lip either extends automatically when the deck assembly angularly raises the top of its stroke, or it can be short cycled by mimicking the deck cylinder being fully extended, i.e., by the activation of a solenoid valve to induce the required pressure to open the sequencing valve. In certain applications, however, it may not be desirable to have the pivoting lip automatically extend when the deck assembly is at a fully raised angular position. Elimination of this automatic extension feature gives the operator total and complete control over the extend movement of the pivoting lip.

SUMMARY OF THE INVENTION

This invention eliminates automatic extension of the pivoting lip at the top of the angular deck stroke, and gives the operator complete control over lip extension motion. As a result, the sequencing valve and associated hydraulic lines typically associated with dock leveler hydraulic circuits are eliminated. Moreover, a single, operator actuated hydraulic switch, in the form of a four-way, two-position solenoid valve is disposed between the hydraulic pump and the deck and lip cylinders. The single, operator actuated hydraulic directional switch thus determines whether pressurized hydraulic fluid is provided to the deck cylinder or to the lip cylinder. If the switch is it its first, relaxed state, pressurized hydraulic fluid is provided to the deck cylinder, and if it is in its second, operative state, pressurized fluid is directed to the lip cylinder.

This invention will be described in greater detail by reference to the attached drawing and the description of the preferred embodiment that follows.

DETAILED DESCRIPTION OF THE PREFERRED EMBODIMENTS

While the invention is described in reference to the following preferred embodiments, there is no intent to limit the scope of the invention to those embodiments. Rather, the invention is intended to cover all modifications, improvements, and equivalents to the disclosed embodiments that fall within the scope of the appended claims.

Figure 1:
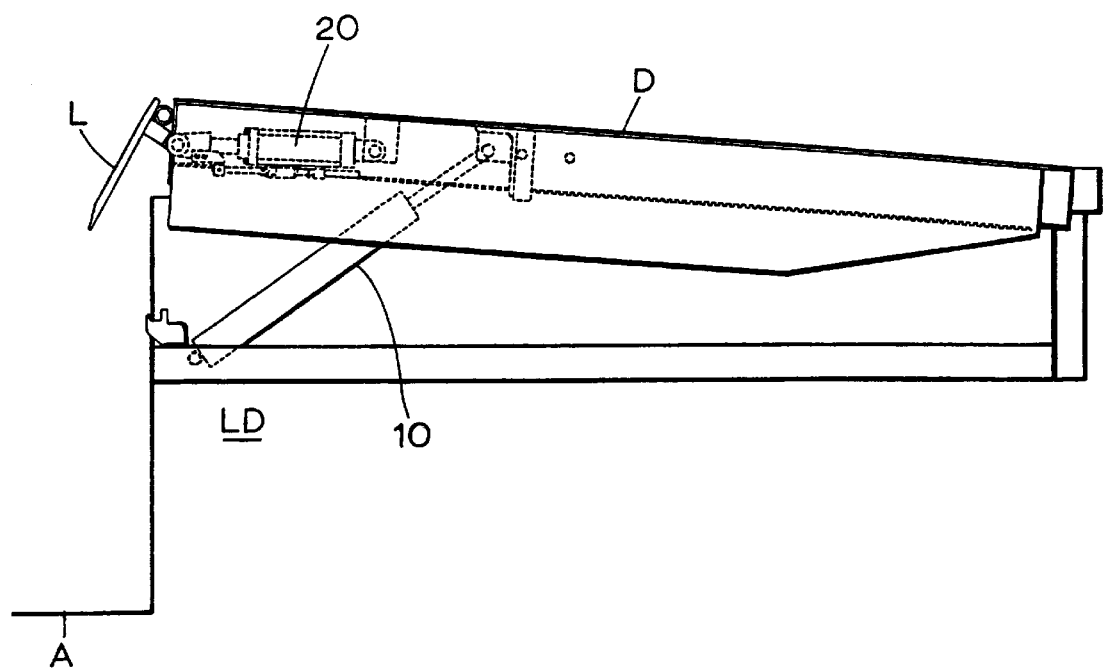
FIG. 1 is a side view of a hydraulic dock leveler during operation.

Referring now to FIG. 1, a side view of a dock leveler disposed at a loading dock is depicted. The loading dock LD is adjacent to a driveway approach A over which the vehicle to be loaded and unloaded would travel during its approach to the dock. The dock leveler includes a deck D and an attached, pivotal lip L. A deck cylinder 10 is provided for raising the deck from a horizontal, stored position to an angular raised position. Similarly, a second hydraulic cylinder 20, commonly referred to as the lip cylinder is also provided for providing the power to extend the pivotal lip from a pendant position where it is substantially perpendicular to the deck, through the transitory position shown in FIG. 1, to an extended position where it is substantially co-planar with the deck D, to form a bridge between the deck and a parked vehicle at the loading dock.

Figure 2:
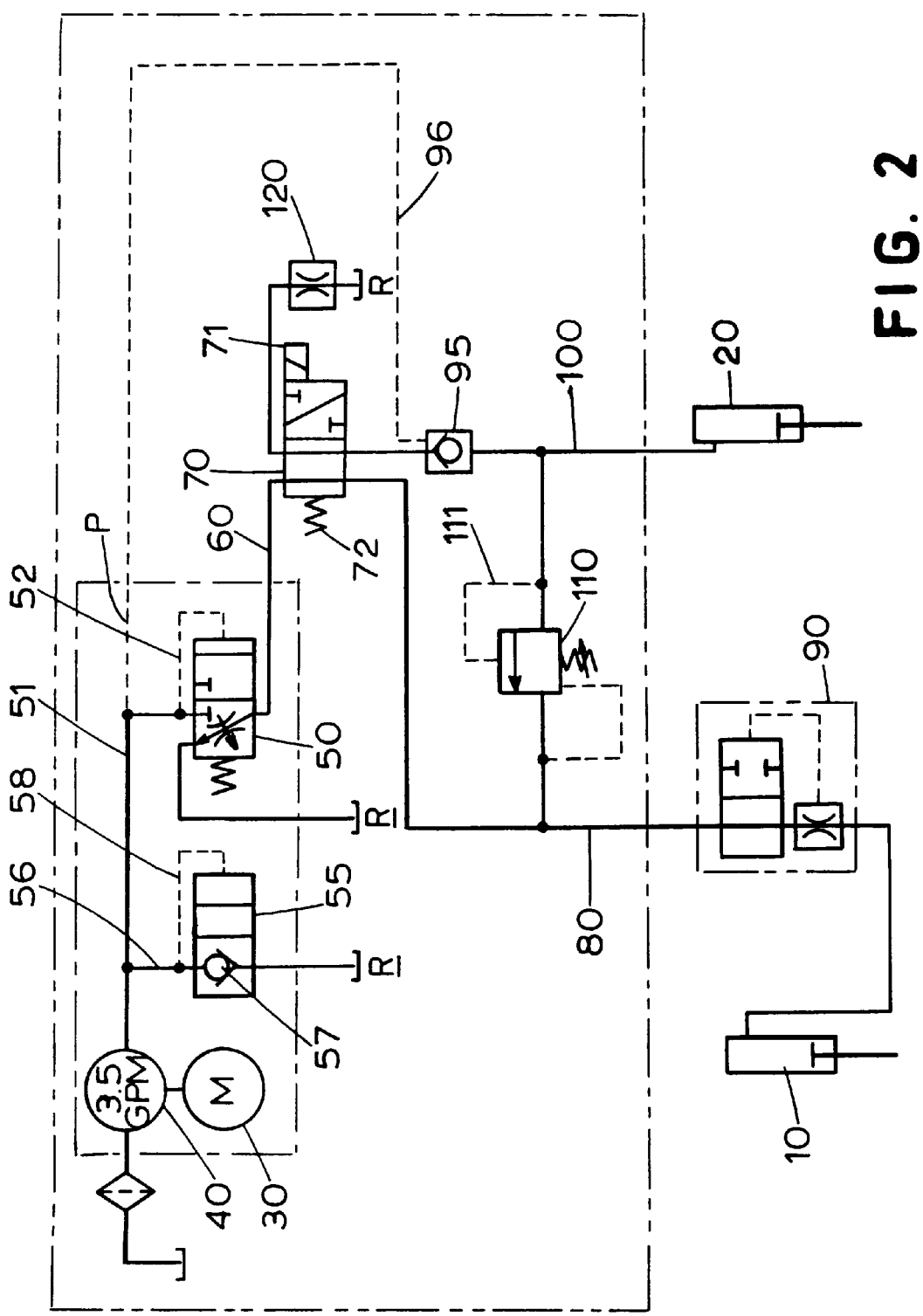
FIG. 2 is a schematic of a dock leveler hydraulic circuit according to the invention.

FIG. 2 is a schematic of the dock leveler hydraulic circuit according to the invention. The ramp cylinder 10 and lip cylinder 20 from FIG. 1 are now shown in schematic form. The circuit includes a pump subsystem, depicted by P in FIG. 2. This pump subsystem provides the source of pressurized hydraulic fluid to the remainder of the circuit for the purpose of actuating the ramp and lip. In this embodiment, the pump subsystem P comprises a motor 30, operatively connected to a pump 40, illustratively a 3.5 gallon per minute pump, such as manufactured by Fenner Fluid Power under part number N1-0027-1C. The pump subsystem also includes a system relief valve 55. A ball check 57 typically prevents the flow of fluid from line 51 through the system relief valve. However, for extremely high pressures (such as 850–1100 psi), induced pressures of this magnitude in the pilot line 58 will move the system relief valve to the left and allow pressurized hydraulic fluid to flow from line 51 directly to the reservoir R. This system relief valve ensures that the remainder of the circuit never sees pressurized hydraulic fluid above the set point of this valve.

A shuttle valve 50 is provided to ensure that returning pressurized hydraulic fluid from the descent of the deck assembly will not enter into the pump assembly causing it to spin in reverse (causing possible damage to pump gears). When the pump is in an operative state the pressurized hydraulic fluid supplied to the system will induce a pressure rise in fluid line 51, pressurized hydraulic fluid flows through pilot port 52 to move the shuttle valve from the position shown in FIG. 2 toward the left such that the fluid in line 51 can pass through the shuttle valve and into fluid line 60.

The pump subassembly P thus provides pressurized hydraulic fluid to the remainder of the hydraulic circuit through hydraulic line 60. To control whether the pressurized hydraulic fluid provided by pump subassembly P is directed either to the deck cylinder 10 or the lip cylinder 20, the hydraulic circuit includes hydraulic switch 70 in the form of a four-way, two-position solenoid valve. The presently-preferred valve is that manufactured by Deltrol Fluid Products, under valve body and nut part number DSV2-100-4T-N-C3, and solenoid coil 115V part number 10162-84.

Figure 3:
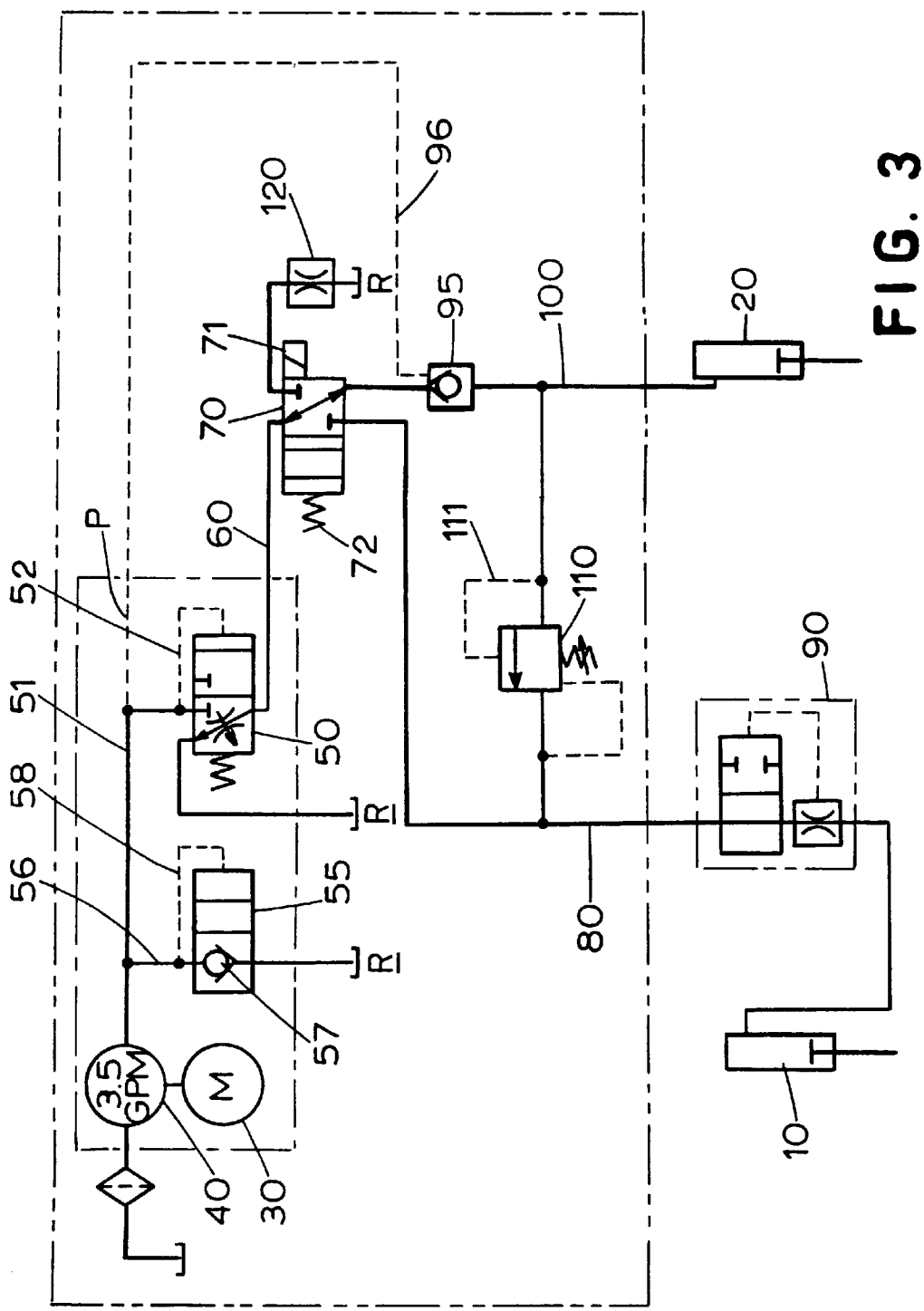
FIG. 3 is a schematic of the inventive dock leveler hydraulic circuit in lip extension mode.

Valve 70 has two positions, one shown in FIG. 2, and the other shown in FIG. 3. Movement of the valve 70 between the two positions is controlled by the operator through the solenoid 71. A push button or other electrical control on a control box (not shown) controls whether solenoid 71 is in a first or relaxed state, or a second or operative state. When in a relaxed state, spring 72 biases valve 70 such that it is in the position shown in FIG. 2. In an operative state the solenoid 71 moves the valve 70 against the bias of the spring to the position shown in FIG. 3. When energy is then removed from the solenoid, spring 72 returns it to the position of FIG. 2. When in the position of FIG. 2, pressurized hydraulic fluid from pump subassembly P is provided by a line 60 to the deck cylinder through the valve 70. Hydraulic line 80 extends from the valve 70 to the deck cylinder 10. Advantageously, a velocity fuse 90 may be disposed between the pump P and the deck cylinder 10. The velocity fuse will arrest downward angular deck assembly motion in the event a certain critical speed is exceeded, but otherwise does not form an aspect of the present invention. In any event, with the pump subsystem P activated, and valve 70 in its first position shown in FIG. 2, pressurized hydraulic fluid will be provided to the deck cylinder 10 for the purpose of raising the deck assembly from a stored, horizontal position to a upwardly angular inclined position.

Given that the hydraulic circuit shown in the Figures does not include a sequencing valve for automatically extending the pivotal lip when the deck assembly is at a fully raised angular position, automatic lip extension at the top of deck stroke does not occur. Rather, when the deck assembly is at a fully raised angular position, and assuming the motor is still being operated, the pump will simply continue to run with the hydraulic fluid being ported to the reservoir through the system relief valve 55. If the operator should continue to run the pump in this configuration, safe guards are in place to prevent the pump and motor from overheating and operation of the pump and motor will be terminated prior to that occurring.

It should be noted that in the event the pump subsystem P is not running and solenoid valve 70 is in the position shown in FIG. 2, hydraulic fluid is free to flow from the deck cylinder 10 through valve 70 through shuttle valve 50 and back to the reservoir R. It is this flow of hydraulic fluid that allows the deck assembly to move from its fully raised angular position down toward a horizontal position for the purpose of either returning to the stored position or placing the extended lip onto the back of the vehicle. It is during this downward motion of the deck that velocity fuse 90 ensures that a certain speed is not exceeded. If that speed is exceeded, the deck will automatically stop in place.

To provide extension of the lip from its pendant to its extended position, valve 70 has a second position, as shown in FIG. 3. As can be seen from FIG. 3, with solenoid 71 energized and valve 70 in the second position, pressurized hydraulic fluid in line 60 flows through the valve 70 and to hydraulic line 100 through check valve 95. The pilot line 96 connected to check valve 95 ensures that the check valve 95 is open whenever the pump is on. When the pump is not on, check valve 95 closes and thus holds the lip in whatever position it may be in. Assuming the pump is on, however, when operator actuated hydraulic switch 70 is in its second operative state, pressurized hydraulic fluid will be provided to line 100 and thus to the lip cylinder 20, tending to pivot the lip from the pendant toward its extended position. It will be noted that hydraulic line 80 connected to the deck cylinder 10 is ported off with the valve 70 in the position of FIG. 3. Accordingly, when the solenoid valve 70 is in an operative state (assuming the pump is still running), the deck assembly stops at its present position and the pivotal lip will begin to extend.

Subsequent de-energization of the solenoid 71 associated with valve 70, will cause the valve to return to the position of FIG. 2. Typically, the operator will release both actuated push buttons returning the solenoid 71 to a relaxed state and allow the pump to turn off simultaneously. If that is the case, the deck assembly will be free to descend angularly downward as previously described. At the same time, the pivotal lip will be held in its extended position. This is due to the fact that line 100 includes the closed check valve 95 when the pump is not running. In addition, the presence of the adjustable check valve 110 also prevents the pivotal lip from retracting to a pendant position. Since the deck assembly is descending, pressurized hydraulic fluid is pushed through line 80 and back to reservoir R. Accordingly, there is a positive hydraulic fluid pressure on the left side of valve 110 that is greater than any hydraulic fluid pressure being exerted on valve 110 by the hydraulic fluid pressure generated in line 100 from the weight of the pivotal lip, and its tendency to retract due to gravity. Thus, as long as the heavier deck assembly is descending angularly downward, the pivotal lip stays extended. It is also possible, however, that the dock leveler will have been actuated and the lip extended without a vehicle actually being present. If this occurs, the deck assembly will eventually descend angularly downward to its bottom most position and stop moving downwardly. At this point, a positive hydraulic fluid pressure will not be present in line 80 and the hydraulic fluid pressure now being exerted in line 100 by the pivotal lip wanting to retract to a pendant position will be sufficient to generate hydraulic fluid pressure in pilot line 111 to move the adjustable check valve so that pressurized hydraulic fluid can now flow from line 100 through valve 110 into line 80 and back to the reservoir. This ensures that if the leveler is activated without a truck present, and if the deck assembly falls to its lowest position, that the lip will not be stuck in its extended position where it could be contacted unwittingly by the next approaching vehicle. One of skill in the art will also appreciate that hydraulic dock levelers typically also include an automatic return to dock feature which would restore the leveler to its stored position if this circumstance were to occur.

In the event that the pump is operating with the lip in the extended position and the valve 70 in the position of FIG. 2, the lip will undergo a controlled fall. This is due to the fact that the pump being operated has opened pilot operated check valve 95, thus providing a fluid flow path from line 100 back to reservoir R through the fixed orifice 120. Orifice 120 has been sized appropriately to ensure a controlled rate of retraction for the pivotal lip as it pivots from an extended position to the pendant position. One of ordinary skill in the art will appreciate that the typical mode for this action to occur is following the loading or unloading of a vehicle when it is desired to restore the dock leveler to its stored position, with the lip pendant. To do this, the operator will typically operate the pump by pushing the "raise" button on the control box (not shown). Accordingly, the deck assembly will raise angularly upwardly and the pivotal lip will "retract" to its pendant position at a controlled rate as previously described. The operator will typically release the "raise" button when the pivotal lip is at a fully pendant position, this will turn the pump off. Now with the pump off the deck assembly is allowed to descend angularly downward into its horizontal stored position, with the pivotal lip in its pendant position.

Use of the hydraulic control circuit according to the invention will provide a new and different operational sequence for hydraulically-actuated dock levelers. As before, both a "raise" button and a "lip out" button will be provided on the control box (not shown). The raise button operates the pump and motor and raises the deck assembly, and the lip out button extends the pivotal lip. However, operation will be different from convention in that the lip will not automatically extend once the deck assembly reaches a fully raised angular position. This function not only gives greater control of leveler activation, but also allows the elimination of the conventional sequence valve, which results in a significant cost savings. Instead of waiting for automatic lip extension, the operator is free to extend the pivotal lip whenever it is deemed safe and appropriate to do so. While still causing the pump to run (i.e., by holding down the "raise" button), the operator then actuates the "lip out" button, causing solenoid 71 to be energized and valve 70 to move to the position of FIG. 3. This will cause the deck assembly to be held in position, and the pivotal lip to extend. Once the pivotal lip is appropriately extended, the operator can then remove his fingers from both buttons. The deck assembly would then descend angularly downward with the pivotal lip extended until the pivotal lip comes to rest on the bed of the vehicle. It should be noted that the solenoid valve 70 also performs an advantageous "emergency stop" function. If the pump is not operating and the deck assembly is descending angularly downward, energizing solenoid 71 will move the valve to the position of FIG. 3. Line 80 will now be connected to a closed port, holding the deck assembly in its position. Since the pump is not operating, the pilot operated check valve 95 will similarly hold the pivotal lip in its position. Thus, with the pump not operating, actuation of valve 70 holds all of the components of the leveler in there present position.

There has thus been disclosed a novel hydraulic control circuit for a hydraulic dock leveler. A pump subsystem provides a source of pressurized fluid. A single, operator actuated hydraulic directional switch then determines whether that pressurized hydraulic fluid is provided either to the deck cylinder, or to the lip cylinder. The typical sequencing valve that provides for lip extension upon the deck assembly reaching a fully raised angular position has been eliminated. The resulting hydraulic control system is thus of substantially simplified operation and construction, as well as having the advantage of eliminating the unnecessary cost associated with a sequence valve.

What is claimed is:

1. A hydraulic control circuit for a dock leveler which includes a deck pivotable between stored and raised positions and a lip pivoted to the deck for movement between pendant and extended positions, the hydraulic control circuit comprising:

a deck cylinder couplable to the deck for controlling motion of the deck;

a lip cylinder couplable to the lip for controlling motion of the lip;

a reservoir for a supply of hydraulic fluid, a pump for providing a source of pressurized fluid to the deck and lip cylinders, and in fluid communication with the reservoir;

an operator-actuated switch; and a fluid valve in communication with the pump and the reservoir, the valve having a first position wherein the valve directs the pressurized hydraulic fluid to the deck cylinder and provides a path for the lip cylinder to drain to the reservoir, and a second position wherein the valve directs the pressurized hydraulic fluid to the lip cylinder, wherein actuation of the operator-actuated switch causes the valve to assume one of the first and second position regardless of the hydraulic pressure in the circuit and regardless of the position of the deck.

2. A circuit as defined in claim 1, wherein the valve is a two-position, four-way solenoid valve, and the switch is in electrical communication with a solenoid associated with the valve.

3. A circuit as defined in claim 1, wherein the valve is movable between the first and second positions.

4. A circuit as defined in claim 1 wherein the lip cylinder is movable between an extended position and a retracted position, and further comprising a check valve disposed between the lip cylinder and the deck cylinder for selectively permitting movement of the lip cylinder from the extended position to the retracted position when hydraulic pressure associated with the lip cylinder exceeds hydraulic pressure associated with the deck cylinder.

5. A circuit as defined in claim 1 further comprising a check valve in communication with the lip cylinder and the fluid valve, the check valve having a first check valve position wherein the check valve permits fluid flow between the lip cylinder and the fluid valve, ans a second check valve position wherein the check valve precludes fluid flow from the lip cylinder to the fluid valve, wherein the check valve assumes the first check valve position when the pump is sourcing pressurized fluid above a predetermined magnitude and otherwise assumes the second check valve position.

6. A circuit as defined in claim 5 wherein the fluid valve couples the check valve to a reservoir when the fluid valve is in the first position such that running the pump with the fluid valve in the first position will vent the lip cylinder to the reservoir.

7. A circuit as defined in claim 6 wherein the lip cylinder is movable between an extended position and a retracted position, and further comprising a second check valve disposed between the lip cylinder and the deck cylinder for selectively permitting movement of the lip cylinder from the extended position to the retracted position when hydraulic pressure associated with the lip cylinder exceeds hydraulic pressure associated with the deck cylinder.

8. A circuit as defined in claim 1 further comprising a pressure actuated valve in communication with the lip cylinder, the pressure actuated valve being responsive to a predetermined pressure condition within the hydraulic circuit for automatically moving the lip toward the pendant position.

9. A circuit as defined in claim 8 wherein the predetermined pressure condition comprises hydraulic pressure associated with the lip cylinder exceeding hydraulic pressure associated with the deck cylinder by a predetermined amount.

* * * * *